(12) United States Patent
Wohlfahrt et al.

(10) Patent No.: US 10,436,314 B2
(45) Date of Patent: Oct. 8, 2019

(54) METHOD FOR OPERATING AN AUTOMATIC GEARBOX OF A MOTOR VEHICLE

(71) Applicant: ZF Friedrichshafen AG, Friedrichshafen (DE)

(72) Inventors: Dennis Wohlfahrt, Meersburg (DE); Harry Nolzen, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/750,517

(22) PCT Filed: Jul. 19, 2016

(86) PCT No.: PCT/EP2016/067105
§ 371 (c)(1),
(2) Date: Feb. 6, 2018

(87) PCT Pub. No.: WO2017/029045
PCT Pub. Date: Feb. 23, 2017

(65) Prior Publication Data
US 2018/0238442 A1    Aug. 23, 2018

(30) Foreign Application Priority Data

Aug. 14, 2015  (DE) .................. 10 2015 215 545

(51) Int. Cl.
*F16H 61/00*   (2006.01)
*F16H 61/02*   (2006.01)
*F16D 48/02*   (2006.01)

(52) U.S. Cl.
CPC ..... *F16H 61/0031* (2013.01); *F16H 61/0021* (2013.01); *F16H 61/0206* (2013.01);
(Continued)

(58) Field of Classification Search
CPC ............ F16H 2312/14; F16H 2312/16; F16H 2312/20
See application file for complete search history.

(56) References Cited

U.S. PATENT DOCUMENTS 6,672,990 B2   1/2004 Netzer
9,002,598 B2   4/2015 Schmidt et al.
(Continued)

FOREIGN PATENT DOCUMENTS

DE   199 61 796 C1   9/2001
DE   100 42 146 A1   3/2002
(Continued)

OTHER PUBLICATIONS

Machine Translation of DE 102010020066 filed Mar. 28, 2019. (Year: 2019).*
(Continued)

*Primary Examiner* — Tisha D Lewis
(74) *Attorney, Agent, or Firm* — Davis & Bujold PLLC; Michael J. Bujold

(57) ABSTRACT

A method for operating an automatic transmission (1) of a motor vehicle in which a hydraulic pump, associated with a hydraulic system, for supplying pressure in the hydraulic system is driven by a drive engine and in which hydraulic shifting elements (B1, B2, B3, C1, C2) are actuated to engage gear steps. According to the method, before the drive engine is turned off for a short duration of time, at least one non-actuated shifting element (B1, B2, B3, C1, C2) of the automatic transmission (1) is actuated or filled with pressure oil.

10 Claims, 1 Drawing Sheet

(52) U.S. Cl.
CPC .. *F16H 61/0267* (2013.01); *F16D 2048/0221* (2013.01); *F16H 61/0202* (2013.01); *F16H 2312/14* (2013.01)

(56) References Cited

U.S. PATENT DOCUMENTS

| | | | |
|---|---|---|---|
| 9,194,486 B2 | 11/2015 | Rogner et al. | |
| 9,574,622 B2* | 2/2017 | Ross | F16D 25/14 |
| 9,631,720 B2 | 4/2017 | Sohler et al. | |
| 2011/0077830 A1* | 3/2011 | Lochocki, Jr. | B60W 10/02 701/68 |
| 2016/0230880 A1 | 8/2016 | Beck et al. | |

FOREIGN PATENT DOCUMENTS

| | | |
|---|---|---|
| DE | 10 2007 003 924 A1 | 7/2008 |
| DE | 10 2007 003 923 A1 | 8/2008 |
| DE | 10 2010 020 066 A1 | 11/2011 |
| DE | 10 2011 004 467 A1 | 8/2012 |
| DE | 10 2011 017 515 A1 | 10/2012 |
| DE | 10 2013 207 005 A1 | 10/2013 |
| DE | 10 2013 220 394 A1 | 4/2015 |
| DE | 10 2013 220 530 A1 | 4/2015 |
| DE | 10 2013 221 035 A1 | 4/2015 |
| DE | 10 2013 222 811 A1 | 5/2015 |
| EP | 1 260 739 A2 | 11/2002 |

OTHER PUBLICATIONS

German Search Report Corresponding to 10 2015 215 545.5 dated Jun. 9, 2016.
German Search Report Corresponding to 10 2015 215 547.1 dated Jun. 16, 2016.
International Search Report Corresponding to PCT/EP2016/067105 dated Sep. 28, 2016.
International Search Report Corresponding to PCT/EP2016/067106 dated Sep. 30, 2016.
Written Opinion Corresponding to PCT/EP2016/067105 dated Sep. 28, 2016.
Written Opinion Corresponding to PCT/EP2016/067106 dated Sep. 30, 2016.

* cited by examiner

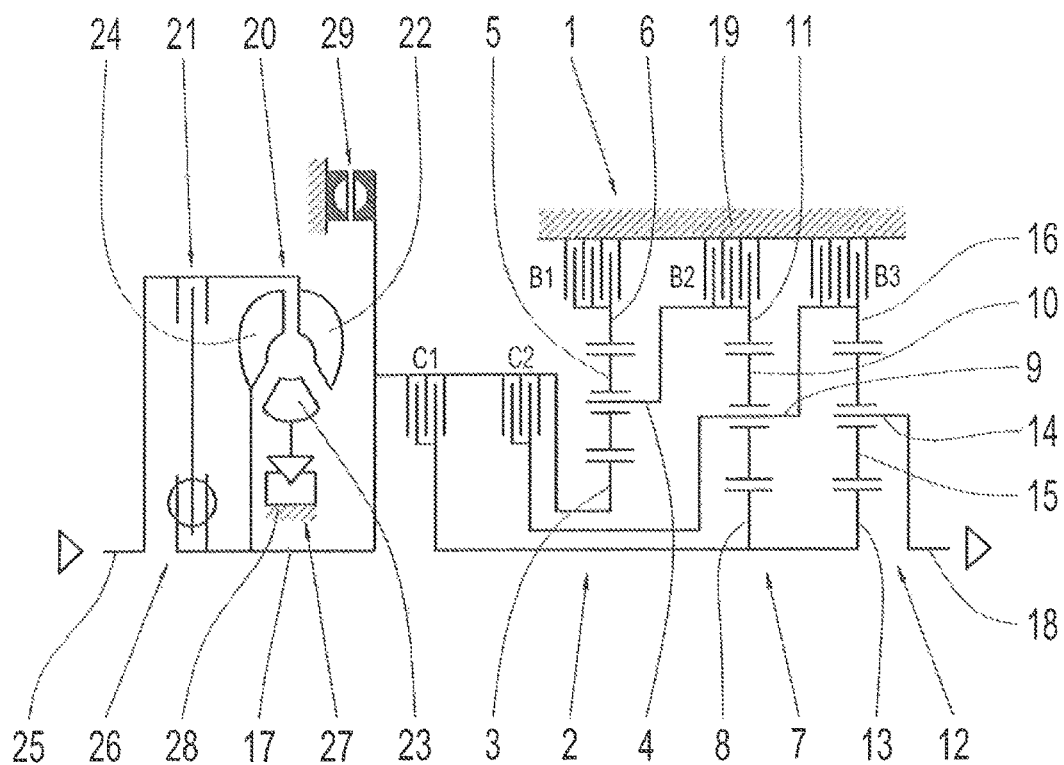

METHOD FOR OPERATING AN AUTOMATIC GEARBOX OF A MOTOR VEHICLE

This application is a National Stage completion of PCT/EP2016/067105 filed Jul. 19, 2016, which claims priority from German patent application serial no. 10 2015 215 545.5 filed Aug. 14, 2015.

FIELD OF THE INVENTION

The present invention concerns a method for operating an automatic transmission of a motor vehicle. In addition the invention concerns an automatic transmission and a control unit designed to carry out the method, a corresponding computer program and a corresponding computer program product.

BACKGROUND OF THE INVENTION

Automatic powershiftable transmissions for vehicles, known as automatic transmissions for shod, usually have as the starting element a hydrodynamic torque converter. Predominantly, these transmissions are designed as range-change transmissions which comprise several planetary gearsets for obtaining a number of gears or gear steps, which are usually engaged by means of hydraulic shifting elements such as disk clutches or disk brakes.

To function properly a transmission needs an effective oil supply for lubrication and cooling, as well as particular filling quantities and oil pressures for shifting the hydraulic components. For this, as a rule a hydraulic pump coupled to a transmission input shaft and driven by the combustion engine is provided and which provides the necessary oil pressure by way of a regulated, valve-controlled hydraulic system.

To reduce the emissions of harmful substances, fuel consumption and noise levels it is also desirable, particularly in urban traffic, to have a so-termed start-stop operating mode in which, depending on the situation and possibilities, when the vehicle is at rest, for example at road junctions with traffic lights, the combustion engine should be switched off. After a subsequent engine start the transmission must be ready again for the transmission of torque as soon as possible. However, in vehicles with torque converter automatic transmissions this is not necessarily straightforward.

Since the hydraulic pump is driven by the combustion engine, pressurized oil is only available when the combustion engine is running. In contrast, when the combustion engine is switched off the hydraulic system loses pressure, whereupon the transmission control system usually disengages the current gear and shifts the transmission to neutral. Before torque can be transmitted again, a certain pressure must first be built up in the hydraulic system before the vehicle can start off. This results in a relatively long activation time until the gear is engaged following an engine start, which makes it practically impossible to have start-stop operation with a high frequency of starting processes and to meet the need, after starting the engine for example when the traffic lights change, to start off as promptly as possible since in practice delays which are too frequent and too long occur.

In order to enable start-stop operation, it is possible for example to use an additional pump driven by an electric motor which, when the combustion engine is switched off, maintains the oil pressure, or else a so-termed hydraulic impulse storage (HIS) system can be connected to the oil circuit of the transmission, by means of which the pressure build-up after an engine start is made substantially faster. However both of these, besides adding to the costs and weight, increase the energy consumption and therefore have a rather counterproductive effect on the energy balance of the start-stop operation, so that where possible they should not be used.

DE 10 2007 003 923 A1 discloses a method for controlling an automatic transmission of a motor vehicle, with hydraulically actuated shifting elements for the engagement of gears, having a hydraulic pump driven by a combustion engine for delivering pressurizing and cooling oil. To reduce an actuation time of the transmission after an engine start, it is provided that when the combustion engine is switched off for a short time, the automatic transmission is set to an electrical shift position of an engaged gear independently of any hydraulic supply pressure.

In DE 10 2007 003 924 A1 a hydraulic system of an automatic transmission is disclosed having a hydraulic pump driven by a combustion engine for supplying pressurizing and cooling oil to hydraulic shifting elements of the automatic transmission. When the combustion engine is switched off, in order to delay a pressure drop in the main pressure circuit, according to DE 10 2007 003 924 A1 it is proposed to connect the main pressure circuit by way of a connecting line containing a one-way valve to a retarder reservoir. The disadvantage of this, however, is that in the hydraulic system an additional connecting line and a one-way valve arranged in the connecting line are needed, which entail additional costs.

SUMMARY OF THE INVENTION

Against this background the purpose of the present invention is to indicate a new type of method for operating an automatic transmission arranged in a motor vehicle, which enables a shorter activation time of the automatic transmission after starting the engine. Furthermore, a corresponding control unit and a computer program and computer program product for carrying out the method are indicated.

From the standpoint of process technology that objective is achieved starting from the characterizing features of the independent claim(s). Furthermore, a control unit, a computer program, a computer program product and an automatic transmission are objects of the subordinate claims and of the description given below.

The activation time for creating the ability of an automatic transmission to transmit torque depends, among other things, on how quickly a main pressure builds up in the hydraulic system after the engine is started. Particularly in start-stop operation this activation time interval can also be made shorter by delaying the drop of the main pressure after the drive engine has been switched off, so that until reactivation as high a pressure level as possible is maintained in the main pressure system in order to be able to act rapidly upon the shifting elements with the necessary pressure and in order to reduce the withdrawal of the hydraulic pistons of the shifting elements from their shifting position.

According to the present invention, a method for operating an automatic transmission of a motor vehicle is proposed, in which a hydraulic pump associated with a hydraulic system for supplying the hydraulic system with pressure is driven by a drive engine, and in which hydraulic shifting elements are actuated for the engagement of gear steps.

To achieve the stated objective, the invention envisages that before the drive engine is switched off for a short time, at least one non-actuated shifting element of the automatic transmission is actuated or filled with pressure oil.

In that way, when the drive engine is subsequently switched off for a short time a leakage taking place in the hydraulic system of the automatic transmission can be compensated by oil volumes from the shifting elements. The result is that the pressure in the hydraulic system is maintained for a longer time, which in turn leads to an at least shortened activation time of the automatic transmission when the drive engine is started. The more shifting elements of the automatic transmission actuated or filled with pressure oil before the brief switching off of the drive engine, the longer the leakage taking place in the hydraulic system can be compensated by oil volumes from the shifting elements. Thus, it can preferably be provided that before the brief switching off of the drive engine, all the shifting elements of the automatic transmission are actuated or filled with pressure oil.

A brief switching off of the drive engine is understood to mean a time period of the order of magnitude of the stop phases during start-stop operation. An activation time is understood to mean an interval from the starting of the combustion engine until the transmission becomes capable of transmitting torque. The transmission is able to transmit torque when, in particular, the shifting elements of a starting gear are sufficiently pressurized and cooled to be able to transmit torque.

A corresponding hydraulic system is preferably divided into a main or primary pressure circuit and one or more auxiliary or secondary pressure circuits. The shifting elements, mostly disk clutches or disk brakes, are preferably associated with the main pressure circuit from which the necessary oil pressure is delivered to the piston chambers of the shifting element pistons. The lubrication of the planetary gearsets and the oil supply to a torque converter and/or a retarder preferably take place from the auxiliary pressure circuit. Advantageously, the auxiliary pressure circuit is supplied by way of a main pressure valve which only opens when the main pressure circuit is saturated, i.e. when it contains the necessary main pressure, so that when the drive engine is started the piston chambers of the shifting elements of the automatic transmission are pressurized first of all.

In addition to supplying pressure, the hydraulic pump can also serve to supply cooling oil to the automatic transmission, particularly for supplying cooling oil to the shifting elements of the automatic transmission. The drive engine can for example be in the form of an internal combustion engine or an electric machine.

The shifting elements of the automatic transmission are actuated by means of valves associated with the shifting elements, for example by means of directly controlled valves. For example, the directly controlled valves of the hydraulic system are in the form of pressure-regulating valves with proportional magnets. Such a pressure-regulating valve keeps a valve seat closed by means of a spring when it is not energized. When the valves are energized electrically, they are changed to an open shifting position whereby the piston chambers and inlet ducts of the shifting element concerned are filled with pressure oil from the main pressure circuit of the hydraulic system.

When a shifting element is actuated the piston of the shifting element is pushed against the spring force of a restoring spring of the shifting element away from its end position, more and more toward the disk packet. During this, in a first phase no torque is yet transmitted by the shifting element. Only when the air gap of the disk packet has been fully bridged does the shifting element become frictionally effective and torque can then be transmitted by the shifting element.

In an advantageous embodiment of the invention, the at least one shifting element of the automatic transmission which is not actuated before the drive engine is switched off briefly, is actuated or filled with pressure oil when the motor vehicle is at rest and a converter bridging clutch of a torque converter that serves as the starting element is open. If the motor vehicle is in such an operating condition, reliable operation of the automatic transmission is ensured even if all the shifting elements of the automatic transmission are filled with pressure oil sufficiently for them to be able to transmit torque. Thus, a blocking of the automatic transmission caused by the actuation of the shifting elements does not result in a critical driving situation.

In an embodiment of the invention it is provided that the compensation of a leakage taking place while the drive engine is switched off is initially provided by means of oil volumes from shifting elements not associated with a starting gear of the automatic transmission. If the leakage in the main pressure circuit can be compensated for by oil from the shifting elements not associated with a starting gear until the engine is started, then the shifting elements of the starting gear are already closed and the starting process of the motor vehicle can take place immediately.

Furthermore, it can be provided that valves of shifting elements not associated with the starting gear of the automatic transmission are shifted without being energized if the pistons of the shifting elements are at their end positions again due to the compensation of leakage. By interrupting the energization of the valves, a prolonged loading of the proportional valves involved and disadvantageous current consumption are avoided.

The invention also concerns a control unit for an automatic transmission for carrying out the above-described method. The control unit comprises means that function to implement the method according to the invention. These means include both hardware means and software means. The hardware means are for example data interfaces for the purpose of exchanging data with the assemblies involved in the implementation of the method according to the invention, as well as one or more processors for data processing and memories as necessary for data storage. The software means consist of program modules for implementing the method according to the invention. The control unit can for example be a transmission control unit.

In addition the invention relates to a computer program with program code means suitable for carrying out the method according to the invention when the computer program is run on a computer or a corresponding computation unit, in particular a control unit according to the invention.

The computer program product according to the invention comprises on a computer-readable data carrier, and stored program code means suitable for implementing a method according to the invention when the computer program is run on a computer or a corresponding computation unit, in particular a control unit according to the invention.

In addition the invention relates to an automatic transmission of a motor vehicle, which comprises a control unit according to the invention. Furthermore the automatic transmission comprises a hydraulic pump associated with a hydraulic system of the automatic transmission for the supply of pressure. The hydraulic pump can be driven by a drive engine. For this, the hydraulic pump is preferably coupled to the input shaft of the automatic transmission. To engage gear steps hydraulic shifting elements of the automatic transmission can be actuated. The shifting elements are preferably designed as "normally open" shifting elements and have a piston arranged in a piston chamber and held in its end position by a restoring spring. It is provided that the restoring springs of the individual shifting elements have different spring forces. Preferably, the restoring springs of the shifting elements associated with a starting gear have lower spring forces than the restoring springs of the other shifting elements. The restoring springs can for example be in the form of spiral springs or cup springs. In addition the automatic transmission can comprise a hydrodynamic starting element which comprises a pump wheel on the drive input side and a turbine wheel on the drive output side, and which serves to transmit torque in a motor vehicle drivetrain when the vehicle is started. The hydrodynamic starting element can for example be in the form of a hydrodynamic torque converter or a hydrodynamic clutch.

With the present invention it is proposed for the first time to use the shifting elements in an automatic transmission of a motor vehicle as hydraulic reservoirs. In that way start-stop operation with a shorter activation time of the automatic transmission after the drive engine is started can be realized, without for example needing the hydraulic impulse storage HIS system known from the prior art connected to the hydraulic circuit of an automatic transmission.

To reduce the activation time still further, the method can advantageously be combined with further control measures and/or control means which retard a pressure drop in the shifting elements and/or which accelerate the build-up of pressure after the engine has been started.

Thus, in an advantageous embodiment of the invention, for the further reduction of the activation time of the automatic transmission after the engine is started, it is provided that a valve is arranged between the hydraulic pump and a connecting line of the main hydraulic circuit for supplying the shifting elements of the automatic transmission. When the drive engine is switched off, the valve at least reduces a leakage via the static hydraulic pump, but when the hydraulic pump is rotating it hardly at all influences the volume flow toward the main pressure circuit. Particularly preferably, the valve is integrated in the housing of the hydraulic pump. The valve can be in the form of a seat valve, since in the closed condition seat valves are very effectively leakproof. The valve can for example be a one-way valve. Thus, when the hydraulic pump is not being driven, the valve arranged between the hydraulic pump and the connecting line of the main pressure circuit for supplying the shifting elements of the automatic transmission can reduce a pressure drop in the main pressure circuit of the hydraulic system.

In a further embodiment of the invention it is provided that when the drive engine is at rest, leakage-producing means in the main and/or auxiliary pressure circuits of the hydraulic system are switched to a low-leakage condition. In that way a pressure drop in the main and/or auxiliary pressure circuit can be reduced, and this contributes toward a further reduction of the activation time of the automatic transmission after the engine has been started.

The invention is not limited to the combination of features indicated in the independent claims or the claims that depend on them. There are in addition possibilities for combining individual features with one another provided that they emerge from the claims, the following description of a preferred embodiment of the invention, or directly from the drawing. The references in the claims to the drawing by the use of indexes is not intended to restrict the protective scope of the claims.

BRIEF DESCRIPTION OF THE DRAWING

The method according to the invention is described below with reference to a drawing. The sole FIGURE illustrates a drive train comprising an automatic planetary transmission.

DETAILED DESCRIPTION OF THE PREFERRED EMBODIMENTS

The single FIGURE shows a conventional drivetrain comprising a planetary automatic transmission 1 with an input shaft 17, an output shaft 18 and a hydrodynamic torque converter 20 connected upstream from them. The automatic transmission 1 comprises three planetary gearsets 2, 7, 12 coupled to one another, each consisting of a sun gear 3, 8, 13, a planetary carrier 4, 9, 14 and a ring gear 6, 11, 16 respectively. On the planetary carriers 4, 9, 14 there are in each case a number of rotatably mounted planetary gearwheels 5, 10, 15 distributed around the circumference, which on one side mesh with the respectively associated sun gear 3, 8, 13 and on the other side mesh with the respectively associated ring gear 6, 11, 16.

The automatic transmission 1 has five frictionally acting shifting elements C1 C2, B1, B2, B3, namely two disk clutches C1, C2 and three disk brakes B1, B2, B3, which serve for the engagement of six forward gears and one reversing gear. By closing the first disk clutch C1, the input shaft 17 is connected to the sun gear 8 of the second planetary gearset 7 and the sun gear 13 of the third planetary gearset 12. By means of the second disk clutch C2, the input shaft 17 can be connected to the planetary carrier 9 of the second planetary gearset 7 and the ring gear 16 of the third planetary gearset 12.

By closing the first disk brake B1, the ring gear 6 of the first planetary gearset 2 is braked in a fixed manner relative to the transmission housing 19. By means of the second disk brake B2, the planetary carrier 4 of the first planetary gearset 2 and the ring gear 11 of the second planetary gearset 7 can be held fixed relative to the transmission housing 19. By closing the third disk brake B3, the planetary carrier 9 of the second planetary gearset 7 and the ring gear 16 of the third planetary gearset 12 are held fixed relative to the transmission housing 19.

From the structure of the automatic transmission 1 shown in the FIGURE and the arrangement of the shifting elements C1, C2, B1, B2, B3 it emerges that to engage the gear steps in each case only two shifting elements have to be closed, and to change between two adjacent gear steps, for example to shift from the first gear to the second gear, in each case only one shifting element has to be opened and another shifting element has to be closed.

On the input side, the automatic transmission 1 is connected to an upstream hydrodynamic torque converter 20 provided with a converter bridging clutch 21. The torque converter 20 comprises a pump wheel 22, a guide wheel 23 and a turbine wheel 24. The pump wheel 22 is rigidly connected to an input shaft 25 which is itself connected to the driveshaft of a drive engine (not shown), and which when necessary can be connected by way of the converter bridging clutch 21 and a vibration damper 26 to the input shaft 17 of the automatic transmission 1. The guide wheel 23 is connected via an freewheel clutch 27 to a housing component 28, so that rotation of the guide wheel 23 opposite to the rotational direction of the drive engine is prevented. The turbine wheel 24 is connected to the input shaft 17 of the automatic transmission 1.

When there is a large rotational speed difference between the pump wheel 22 and the turbine wheel 24, which occurs in particular when the vehicle is at rest, i.e. when the turbine wheel 24 is braked and so fixed, then when the converter bridging clutch 21 is open the torque applied to the turbine wheel 24 or the input shaft 17 of the automatic transmission 1 is increased relative to the torque applied to the pump wheel 22 applied by the drive engine, and acts as a so-termed crawling torque. To relieve the load on the wheel brakes of the motor vehicle concerned, in addition a permanent brake in the form of a primary retarder 29 arranged on the input shaft 17 of the automatic transmission 1 is provided. Furthermore, the automatic transmission 1 also comprises a hydraulic pump (not shown here) coupled to the input shaft 17 of the automatic transmission 1 and driven by the drive engine.

According to the present invention, now already before the drive engine is switched off briefly one or more non-actuated shifting elements C1, C2, B1, B2, B3 of the automatic transmission 1 are actuated or filled with pressure oil. For this, a piston of the shifting element C1, C2, B1, B2, B3 concerned is pushed away from its end position against a spring force of a restoring spring, more and more in the direction toward the disk packet. When the air gap of the disk packet has been completely bridged, the shifting element C1, C2, B1, B2, B3 becomes frictionally active and is filled completely with pressure oil. During a subsequent brief switching off of the drive engine in start-stop operation, leakage taking place in the hydraulic system of the automatic transmission 1 can be compensated for by oil volumes from the shifting elements C1, C2, B1, B2, B3. The result is that the pressure in the hydraulic system is maintained for a longer time, which in turn leads to an at least shortened activation time of the automatic transmission 1 after the drive engine has been started.

Preferably the restoring springs of the individual shifting elements C1, C2, B1, C2, B3 have different spring forces. For example the restoring spring of the first disk brake B1 has a higher spring force than the restoring spring of the second disk brake B2, in turn the restoring spring of the second disk brake B2 has a higher spring force than the restoring spring of the second disk clutch C2, in turn the restoring spring of the second disk clutch C2 has a higher spring force than the restoring spring of the first disk clutch C1 and in turn the restoring spring of the first disk clutch C1 has a higher spring force than the restoring spring of the third disk brake B3.

The result of this is that the shifting or application pressures of the individual shifting elements C1, C2, B1, B2, B3 are also different. For example, the shifting or application pressure for the first disk brake B1 can be 1.6 bar, the sifting or application pressure for the second disk brake B2 can be 1.1 bar, the shifting or application pressure for the second disk clutch C2 can be 0.9 bar, the shifting or application pressure for the first disk clutch C1 can be 0.8 bar and the shifting or application pressure for the third disk brake can be 0.7 bar.

Preferably, the starting gear of the automatic transmission is obtained by closing the first disk clutch C1 and the third disk brake B3, i.e. the two shifting elements with the lowest shifting or application pressures.

If the pressure in the hydraulic system drops due to leakage while the hydraulic pump is static, and if before the drive engine was switched off briefly all the shifting elements C1, C2, B1, B2, B3 were actuated or filled with pressure oil, then first of all the piston of the first disk brake B1 begins to move back toward its end position as a result of the leakage in the transmission. The pressure in the hydraulic system then corresponds to the shifting or application pressure of the first disk brake B1, whereas the rest of the shifting elements C1, C2, B2, B3 at first remain closed. If the piston of the disk brake B1 has reached its end position and the pressure in the hydraulic system continues dropping, then the piston of the second disk brake B2 starts moving toward its end position and after that, a further pressure drop causes the piston of the second disk clutch C2 to move toward its end position.

The valves associated with the first disk brake B1, the second disk brake B2 and the second disk clutch C2 are advantageously no longer energized when the pistons of these shifting elements have reached their end positions. Thus, during a subsequent pressure build-up in the hydraulic system after the start of the drive engine these shifting elements C2, B1, B2 remain in their open shifting condition.

Thus, the leakage in the hydraulic system is first compensated for by the oil volumes from the shifting elements C2, B1, B2 that have restoring springs with a higher spring force. Only after that do the pistons of the shifting elements C1, B3 of the starting gear begin moving toward their end positions. Until the moment when the shifting elements C1, B3 of the starting gear are still closed, the automatic transmission can still start rapidly when the drive engine is started.

If the pistons of the shifting elements C1, B3 associated with the starting gear also move toward their end position because of the leakage while the drive engine is switched off, then it is advantageously provided that the valves of the shifting elements C1, B3 of the starting gear remain electrically actuated. In that way, when the drive engine is started loss of time until the starting gear has been selected and activated is avoided. When the drive engine is started the system pressure then builds up almost simultaneously in the main pressure circuit and in the shifting elements C1, B3 of the starting gear, the increasing pressure being passed directly into the shifting element C1, B3 concerned. Consequently the filling time until complete refilling of the piston chambers of the shifting elements C1, B3 with pressure oil is made shorter.

If, due to a very short switch-off time of the drive engine or because the leakage in the hydraulic system is very slight when the drive engine is started the shifting elements C2, B1, B2 are still actuated, these not being needed for obtaining the starting gear, then immediately after the start of the drive engine these shifting elements C2, B1, B2 are opened since the energizing of the corresponding valves is terminated.

INDEXES

1 Planetary automatic transmission
2 First planetary gearset
3 Sun gear
4 Planetary carrier
5 Planetary gearwheel
6 Ring gear
7 Second planetary gearset
8 Sun gear
9 Planetary carrier
10 Planetary gearwheel
11 Ring gear
12 Third planetary gearset 13 Sun gear
14 Planetary carrier
15 Planetary gearwheel
16 Ring gear
17 Input shaft
18 Output shaft
19 Housing
20 Torque converter
21 Bridging clutch
22 Pump wheel
23 Guide wheel
24 Turbine wheel
25 input shaft
26 Vibration damper
27 Freewheel clutch
28 Housing component
29 Primary retarder
B1 Shifting element, disk brake
B2 Shifting element, disk brake
B3 Shifting element, disk brake
C1 Shifting element, disk clutch
C2 Shifting element, disk clutch

The invention claimed is:

1. A method for operating an automatic transmission of a motor vehicle in which a hydraulic pump, associated with a hydraulic system, for supplying pressure in the hydraulic system is driven by a drive engine and in which, to engage gear steps, hydraulic shifting elements are actuated, the method comprising:
actuating or filling at least one non-actuated shifting element, of the automatic transmission, with pressure oil before the drive engine is turned off for a short duration of time; and
actuating the shifting elements of the automatic transmission by energizing directly controlled valves, so that the valves are set to a disengaged shifting position and piston chambers and inlet ducts of the corresponding shifting elements are filled with pressure oil.

2. The method according to claim 1, further comprising at least one of the shifting elements of the automatic transmission, that is not actuated before the drive engine is briefly turned off, is actuated or filled with pressure oil while the motor vehicle is at rest and a converter bridging clutch of a torque converter, serving as a starting element, is disengaged.

3. A method for operating an automatic transmission of a motor vehicle in which a hydraulic pump, associated with a hydraulic system, for supplying pressure in the hydraulic system is driven by a drive engine and in which, to engage gear steps, hydraulic shifting elements are actuated, the method comprising:
actuating or filling at least one non-actuated shifting element, of the automatic transmission, with pressure oil before the drive engine is turned off for a short duration of time; and
initially compensating for a leakage in the hydraulic system, when the drive engine is turned off, by oil volumes from the shifting elements not associated with a starting gear of the automatic transmission.

4. The method according to claim 3, further comprising de-energizing valves of the shifting elements, not associated with the starting gear of the automatic transmission, when pistons of these shifting elements are respectively in end positions due to the compensation of the leakage.

5. A control unit for an automatic transmission, which is designed for carrying out the method according to claim 1.

6. A computer program with program code for carrying out the method according to claim 1, when the computer program is run on a control unit of the automatic transmission.

7. A computer program product with program code stored on a computer-readable data carrier, for carrying out the method according to claim 1, when the computer program is run on a control unit of the automatic transmission.

8. An automatic transmission of a motor vehicle comprising a control unit which is designed for carrying out a method for operating the automatic transmission of the motor vehicle in which a hydraulic pump, associated with a hydraulic system, is driven by a drive engine for supplying pressure in the hydraulic system for actuating hydraulic shifting elements to engage gear steps, and the shifting elements of the automatic transmission have restoring springs with different spring forces, and each of the shifting elements, for engaging a starting gear of the automatic transmission, have restoring springs with lower spring forces than spring forces of restoring springs for other shifting elements not associated with the starting gear of the automatic transmission, the method of operating the automatic transmission comprises actuating or filling at least one non-actuated shifting element, of the automatic transmission, with pressure oil before the drive engine is turned off for a short duration of time.

9. The automatic transmission according to claim 8, wherein each of the shifting elements, for engaging the starting gear of the automatic transmission, have the restoring springs with the lower spring forces than the spring forces of the restoring springs for the other shifting elements not associated with the starting gear of the automatic transmission so that the other shifting elements, not associated with the starting gear of the automatic transmission, are disengaged before the shifting elements for engaging the starting gear of the automatic transmission.

10. The automatic transmission according to claim 8, wherein two of the shifting elements, for engaging the starting gear of the automatic transmission, each have restoring springs with lower spring forces than the spring forces of the restoring springs for the other shifting elements not associated with the starting gear of the automatic transmission so that the other shifting elements, not associated with the starting gear of the automatic transmission, are disengaged before the two shifting elements for engaging the starting gear of the automatic transmission.

* * * * *